Figure 1:
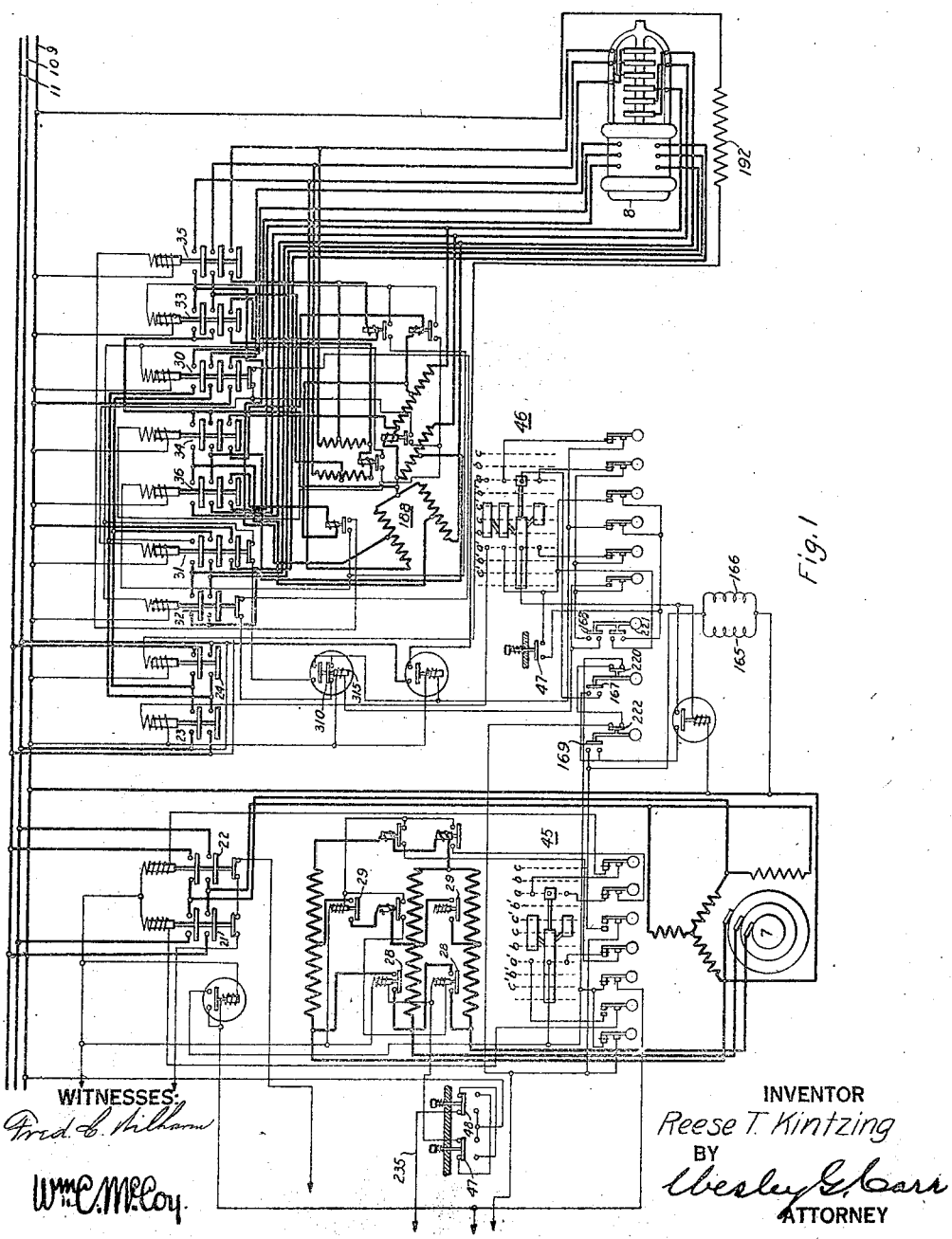

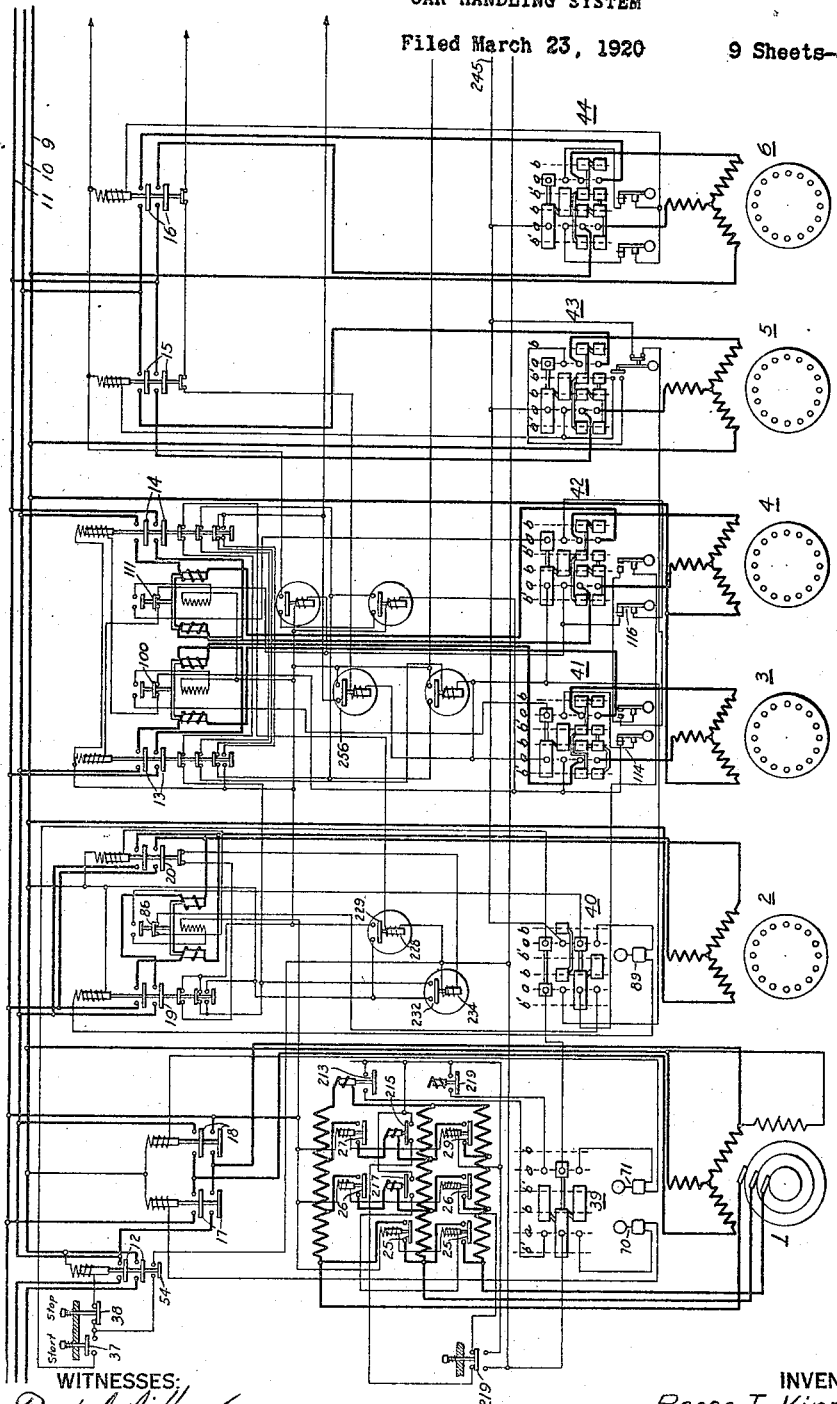

Sept. 29, 1925.

R. T. KINTZING

CAR HANDLING SYSTEM

Filed March 23, 1920  9 Sheets-Sheet 3

WITNESSES:
Fred C. Williams
Wm C. McCoy.

INVENTOR
Reese T. Kintzig
BY
Wesley G. Carr
ATTORNEY

Sept. 29, 1925.   1,555,295
R. T. KINTZING
CAR HANDLING SYSTEM
Filed March 23, 1920    9 Sheets-Sheet 5

WITNESSES:

INVENTOR
Reese T. Kintzing
BY
ATTORNEY

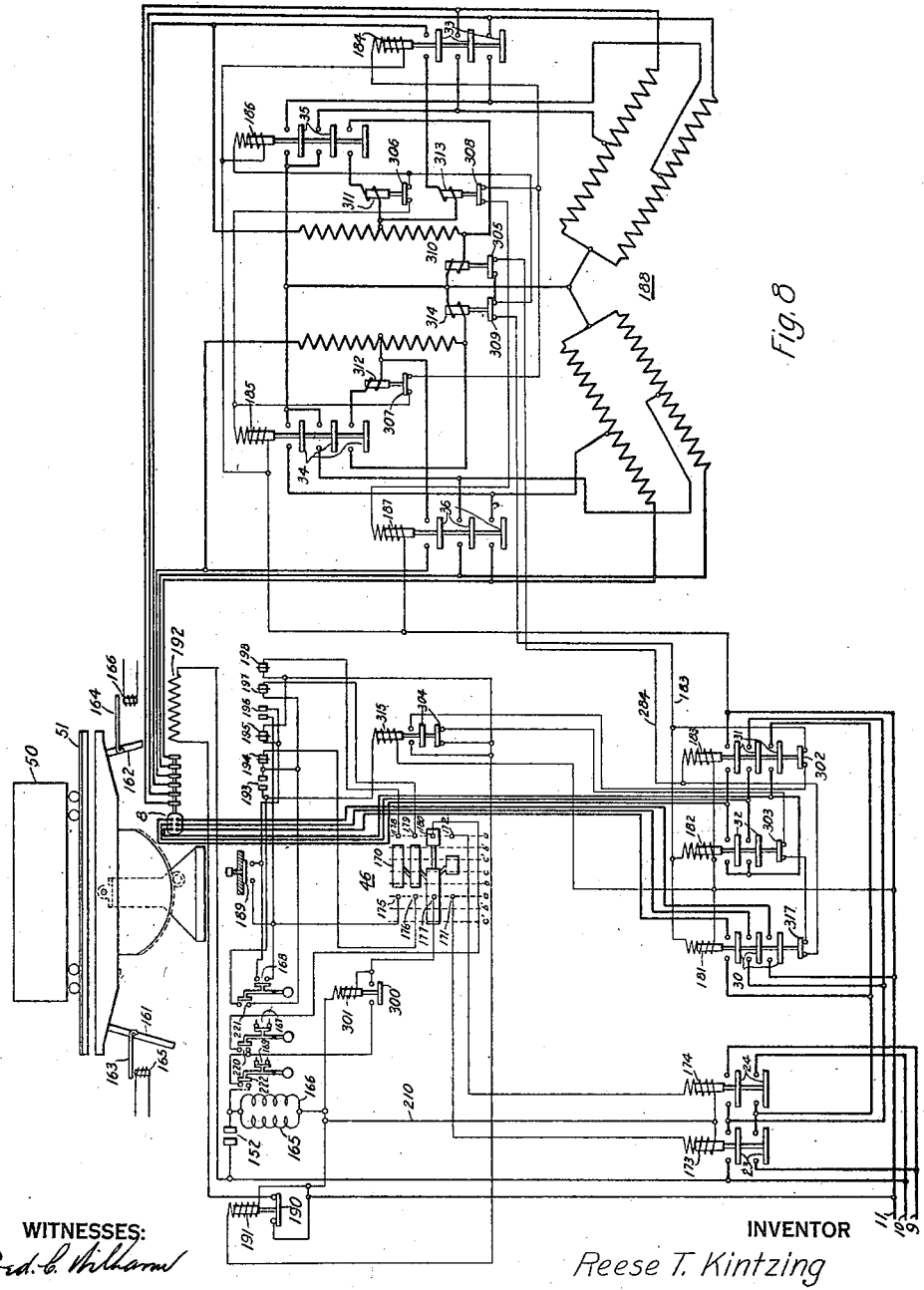

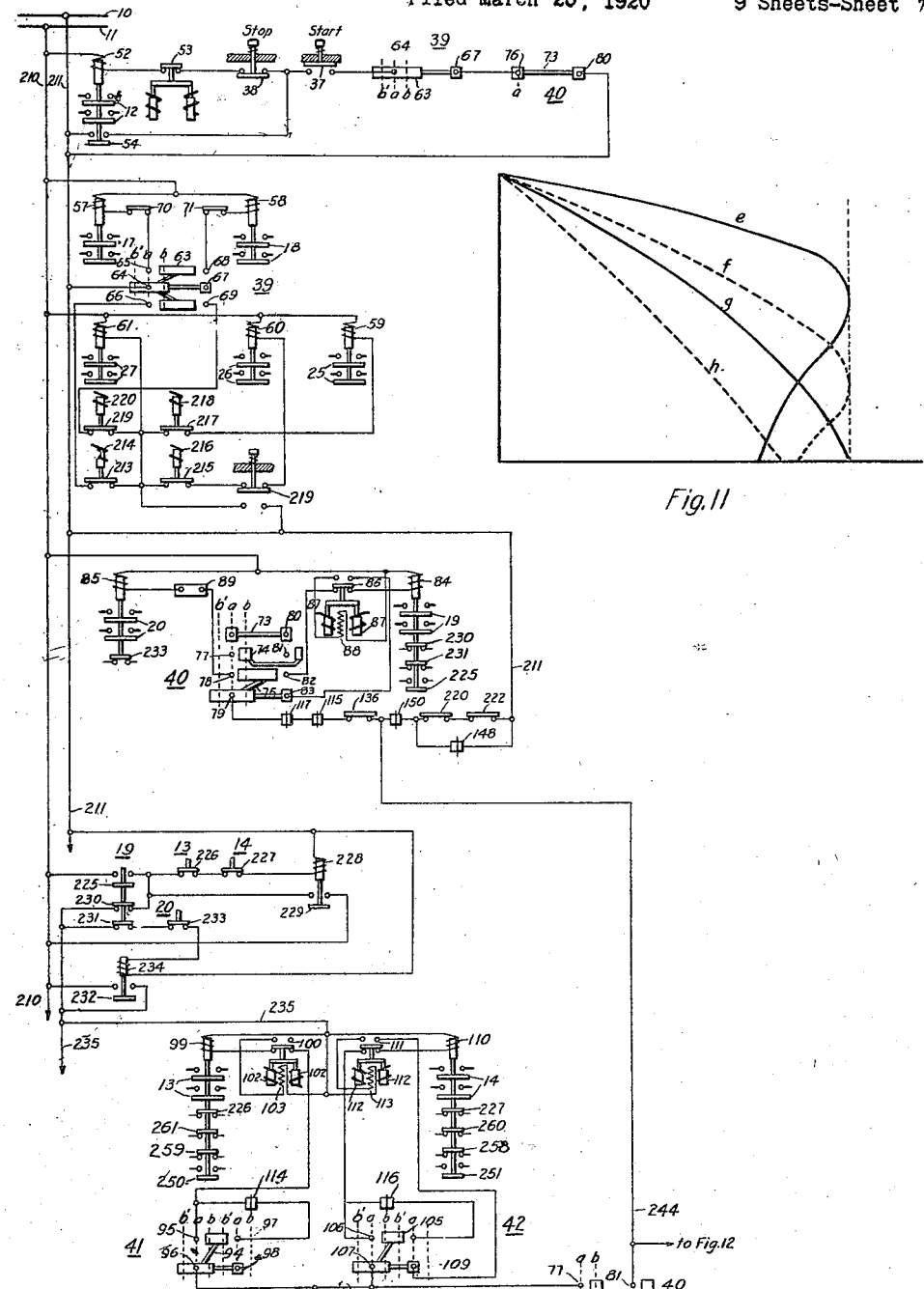

Sept. 29, 1925.  1,555,295
R. T. KINTZING
CAR HANDLING SYSTEM
Filed March 23, 1920   9 Sheets-Sheet 9

WITNESSES:

INVENTOR
Reese T. Kintzing
BY
ATTORNEY

Patented Sept. 29, 1925.

1,555,295

UNITED STATES PATENT OFFICE.

REESE T. KINTZING, OF WILKINSBURG, PENNSYLVANIA, ASSIGNOR TO WESTINGHOUSE ELECTRIC & MANUFACTURING COMPANY, A CORPORATION OF PENNSYLVANIA.

CAR-HANDLING SYSTEM.

Application filed March 23, 1920. Serial No. 368,130.

*To all whom it may concern:*

Be it known that I, REESE T. KINTZING, a citizen of the United States, and a resident of Wilkinsburg, in the county of Allegheny and State of Pennsylvania, have invented a new and useful Improvement in Car-Handling Systems, of which the following is a specification.

My invention relates to motor-control systems and it has particular relation to such systems as are employed for loading and unloading grain cars and the like.

The primary object of my invention is to provide a system that will facilitate the handling of grain cars and minimize the expense associated therewith.

Another object of my invention is to provide a system for controlling a car-handling apparatus that shall be semi-automatic in its operation and be so arranged that the circuits and apparatus corresponding to each stage of operation will be interlocked with the circuits and apparatus corresponding to every other stage of operation in such manner that the process of loading or unloading the cars will be performed in accordance with a given sequence of operation under all circumstances.

An additional object of my invention is to minimize such delays as may be caused by the improper manipulation of the car-handling apparatus.

Another object of my invention is to provide a control system for a cable-operated shuttle car which shall embody means for obtaining maximum pull from the shuttle car when the same is at standstill to initially move the car to be unloaded in the direction of the unloading zone.

Further objects of my invention appear in the specification.

Heretofore, it has been customary to unload cars, and particularly grain cars. manually or, to a limited degree, by means of certain unloading devices.

A system constructed in accordance with my invention provides a much more expeditious and less expensive means for loading and unloading cars than such systems as have heretofore been proposed. According to my invention, I provide a system in which the cars to be loaded or unloaded are moved into an unloading zone where they are securely clamped to a receiving platform or table, the door of the car is semi-automatically opened, the car is laterally tilted to a predetermined degree and is then rocked in an approximately vertical plane in order to discharge its contents or to provide a more ready means for loading the same.

Figure 9:
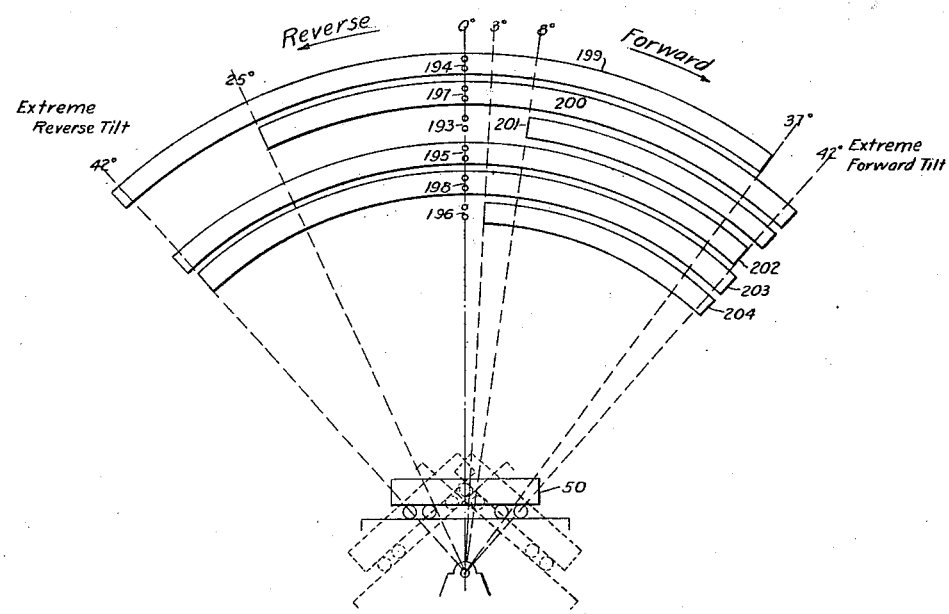
Figures 12, 13:
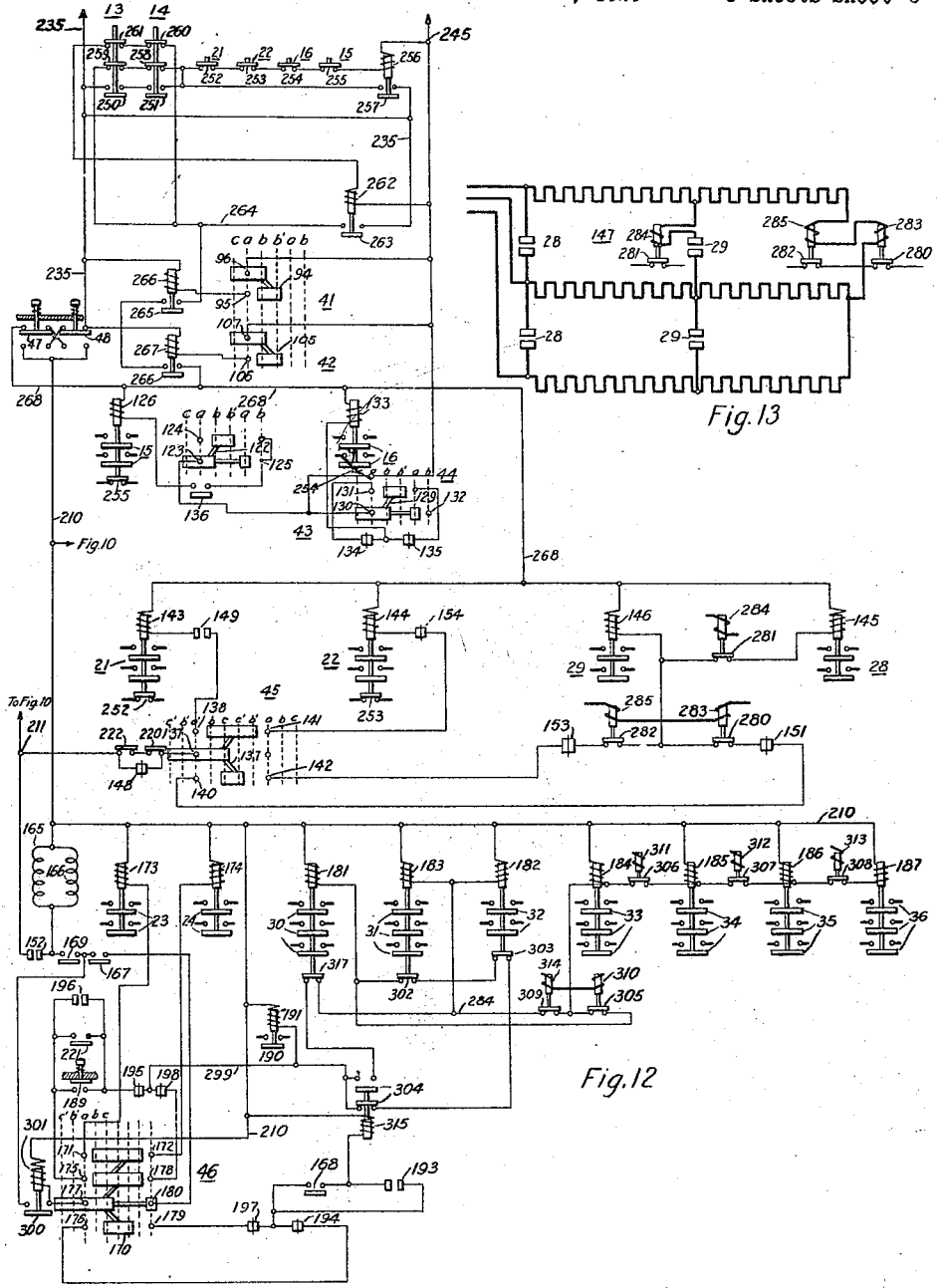
Figure 14:
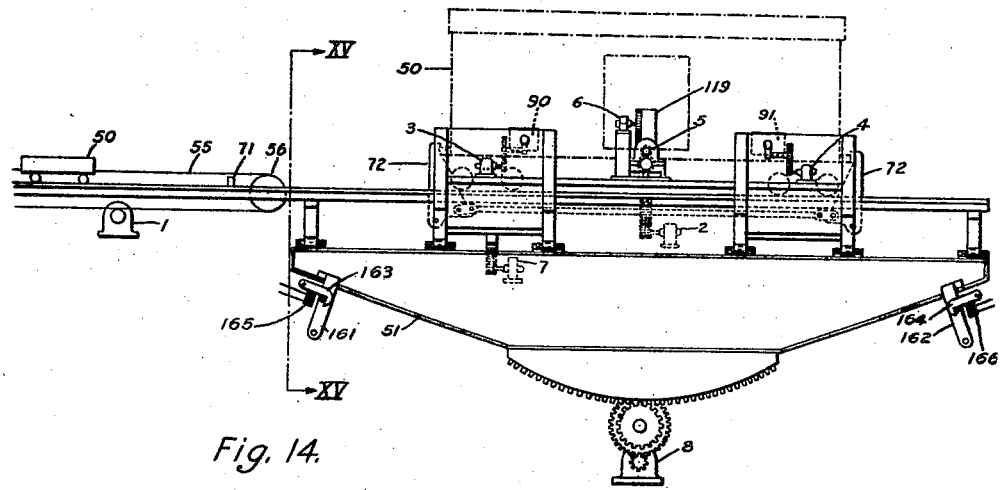
Figure 15:
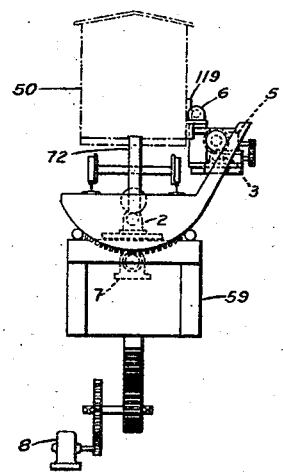

Figures 1 and 1A of the accompanying drawings are diagrammatic views of the main circuits and the associated controlling circuits for a system constructed in accordance with my invention. Figs. 2, 3, 4, 5, 6 and 8 are schematic arrangements of the circuits and the apparatus controlled thereby during the several stages in the operation of the system illustrated in Figs. 1 and 1A. Figs. 7 and 9 indicate the operation of certain associated geared-interlock switches that are employed in conjunction with certain apparatus of the system. Figs. 10 and 12 illustrate the control circuits for the various portions of the system and the manner of interlocking the several control circuits during the operation of the system. Fig. 11 is a speed-torque diagram of an induction motor. Fig. 13 represents a portion of the secondary circuit illustrated in Fig. 6. Figs. 14 and 15 represent the general assembly of apparatus embodying my invention.

Referring particularly to Fig. 1 of the drawing, a plurality of electric motors 1 to 8, inclusive, which are severally adapted to actuate certain portions of the car-handling system, are supplied with energy from main line conductors 9, 10 and 11. A main line switch 12 serves to connect the line conductors 9, 10 and 11 to any suitable source of energy supply. Auxiliary line switches 13, 14, 15 and 16 respectively serve to connect motors 3, 4, 5 and 6 to the line conductors 9, 10 and 11.

The direction of rotation of the several motors is respectively controlled by pairs of switches 17 and 18, 19 and 20, 21 and 22, and 23 and 24, and by master switches 41, 42, 43, and 44.

The speed of operation of the motors 1 and 7 is controlled by the respective sets of accelerating switches 25 to 27, inclusive, and 28 and 29. A set of switches 30, 31 and 32 effect changes in the speed of operation of motor 8 by changing the relation of the motor windings, and a set of accelerating switches 33, 34, 35 and 36 serve to further control the motor speed by progressively shunting portions of a resistor inserted in the secondary circuit of the motor winding.

The operation of the main line switch 12 is controlled by a pair of push-button switches 37 and 38 that are respectively designated "start" and "stop." The various motors of the system are respectively controlled by master switches 39 to 46, inclusive.

A pair of emergency push-button switches 47 and 48 serve to re-establish certain control circuits when, for any reason, the supply of energy to the system is interrupted at an intermediate stage of its operation.

While, in general, the circuits controlled by the master switches and push-button switches are separate and independent, certain of the controlling switches are interlocked with other portions of the system in order that the operation of the various stages of the system may take place in accordance with a predetermined sequence of events. The remaining figures of the drawings separate, to as great a degree as is consistent with a clear showing of the system and apparatus, the various portions of the main car-handling system into its component parts.

Figure 2:
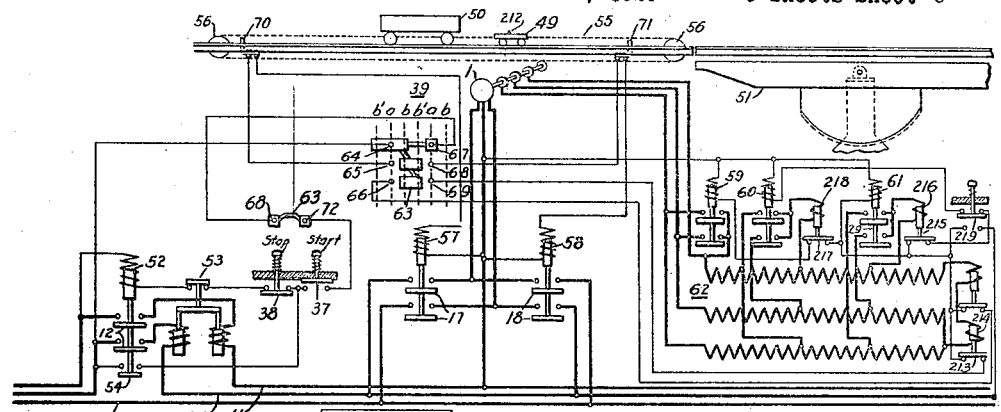

Fig. 2 of the drawings is a detail view of the portion of the system that controls the main line switch 12 and a shuttle car 49 for successively moving the cars to be unloaded, such as the car 50 shown in the drawing, into a "handling zone" which is indicated by the outline of a car-handling table 51.

The main line switch 12, which controls the supply of energy to the system, is provided with an actuating coil 52 which is energized from line conductors 10 and 11 of the supply circuit through a circuit that is controlled by the push-button switch 37, and an overload relay 53. The switch 12 has an interlock 54 which establishes a holding circuit therefor.

The shuttle car 49, which is connected to a cable 55 that extends over drums 56 and is actuated by the motor 1, serves to successively move cars 50 into the unloading zone indicated by the table 51. The master switch 39 controls actuating coils 57 to 61, inclusive, of the directional switches 17 and 18 and the accelerating switches 25, 26 and 27 which successively shunt portions of a resistor 62, that is included in the secondary circuit of the winding of motor 1, to effect the acceleration of the motor. The master switch 39 has a contact segment 63 that engages co-operating contact fingers 64 to 69, inclusive.

A pair of track limit switches 70 and 71 interrupt the associated control circuit when the shuttle car 49 engages either switch of the pair in order to limit the zone of operation of the shuttle car 49.

The details of the circuits and the sequence of operation of the several switches will be hereinafter described in connection with the operation of the complete system.

Figure 3:
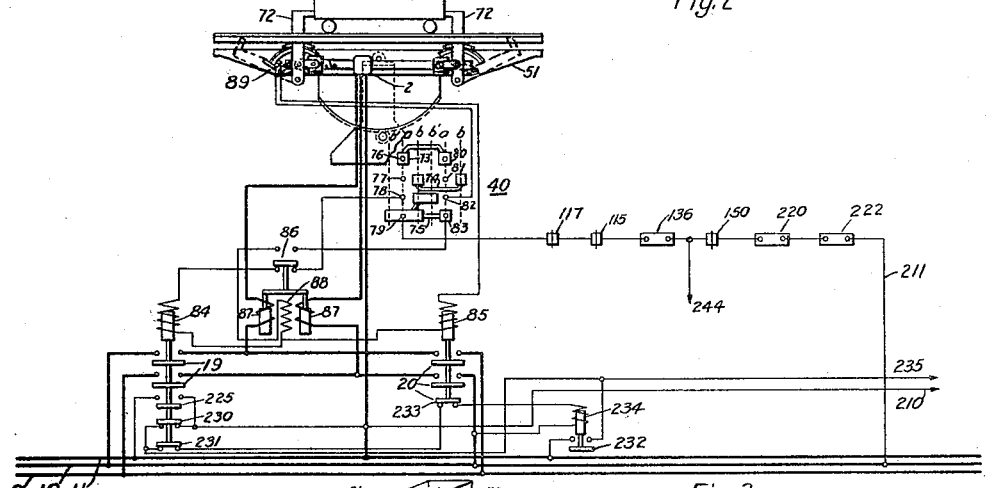
Figure 4:
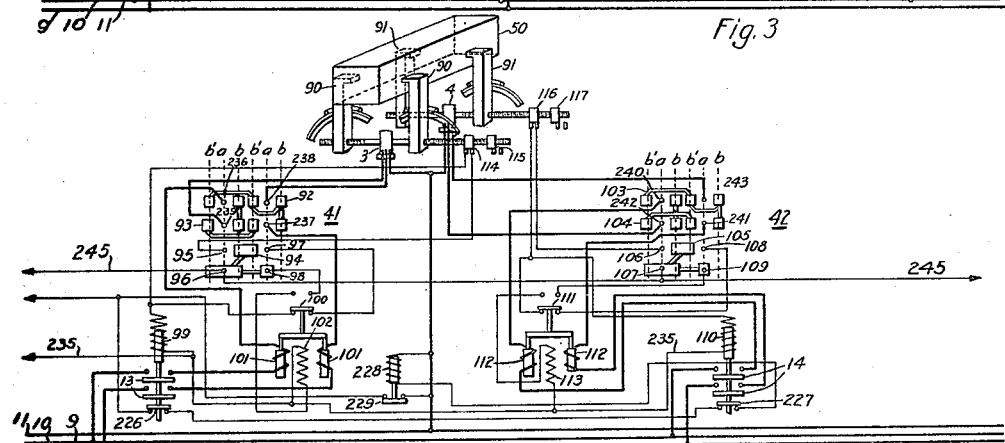

Fig. 3 and Fig. 4 illustrate devices for securely clamping the car 50 to the table 51.

Fig. 3 illustrates a pair of clamps 72 of any suitable construction that are actuated by the motor 2 to engage the respective ends of the car 50 and firmly secure the same to the table 51. The master switch 40 has contact segments 73, 74 and 75 that engage a plurality of co-operating contact fingers 76 to 83, inclusive, to control actuating coils 84 and 85 of the respective directional switches 19 and 20 and certain auxiliary interlocking circuits. An overload relay 86, which has a pair of current coils 87 and a voltage coil 88, is adapted to interrupt the energizing circuit of coil 84 when the current traversing the motor circuit exceeds a predetermined value.

With this form of control, it is possible to operate the motor 2 until it stalls and to interrupt the motor circuit when the clamp 72 exerts a predetermined pressure upon the ends of the car 50, as indicated by the current necessary to trip the relay 86.

A track limit switch 89 completes the circuit associated therewith when the clamps 72 are backed away from the car 50 to their extreme position, as indicated by the dotted outline thereof. Details of these familiar devices have been omitted.

Two pairs of clamping members 90 and 91, shown in Fig. 4 of the drawings, are respectively actuated by motors 3 and 4 in accordance with the position of the respective master switches 41 and 42. The master switch 41 has contact segments 92 and 93 that are adapted to control the direction of operation of motor 3, and an auxiliary contact segment 94, which engages contact fingers 95, 96, 97 and 98 to control the energizing circuit of an actuating coil 99 of the double-pole auxiliary line switch 13. An overload relay 100, which has a pair of current actuating coils 101 and a voltage coil 102, is adapted to effect the opening of the switch 13 when side clamps 90 exert a predetermined pressure upon the sides of the car 50, as indicated by a current of predetermined value traversing the motor circuit.

The master switch 42 has contact segments 103 and 104 that control the direction of operation of the motor 4, and a segment 105 that engages contact fingers 106, 107, 108 and 109 to control the energization of an actuating coil 110 of the double-pole auxiliary line switch 14. An overload relay 111, which has a pair of current actuating coils 112 and a voltage coil 113, is adapted to effect the opening of the switch 14 when a predetermined value of current, which is proportional to the pressure exerted on two sides of the car 50 by the clamps 91, traverses the motor circuit.

Each of the motors 3 and 4 is provided with a pair of geared interlock switches 114 and 115, and 116 and 117 that are actuated in accordance with the position of the respective side clamps in such manner that, when they occupy their extreme outermost positions, the interlocks 114 and 116 complete certain control circuits. The interlocks 115 and 117 interrupt certain other control circuits when the clamps 90 and 91 respectively occupy their clamping positions, as indicated in the drawing.

Figure 5:
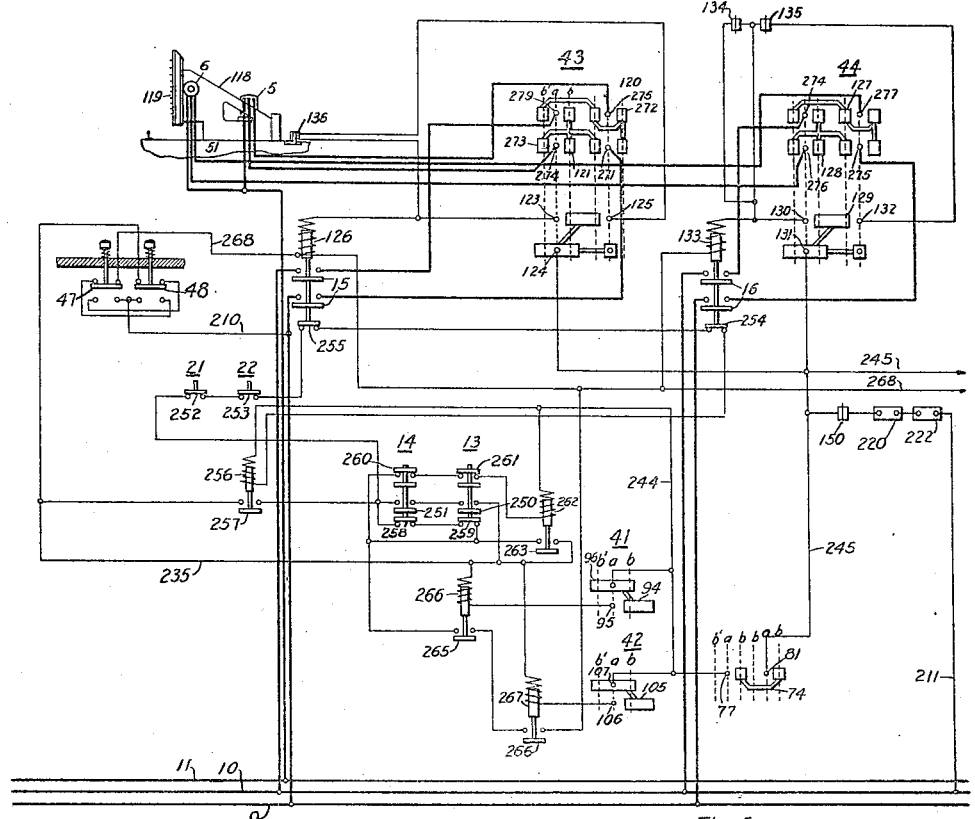

Fig. 5 of the drawings illustrates a door-opening device 118 which is moved transversely across the table 51 by a motor 5 and which has a buffer 119 that is elevated by a motor 6. The circuits for governing the operation of the respective motors 5 and 6 are controlled by master switches 43 and 44.

The master switch 43 has a set of main contact segments 120 and 121 that control the direction of operation of the motor 5, and an auxiliary contact segment 122 that engages contact fingers 123, 124 and 125 to control the supply of energy to an actuating coil 126 of the double-pole auxiliary line switch 15.

The master switch 44 has a main pair of contact segments 127 and 128 that control the direction of operation of the motor 6 and an auxiliary contact segment 129 that engages contact segments 130, 131 and 132 to control the energization of an actuating coil 133 of the double-pole auxiliary line switch 16.

A geared interlock switch 134 interrupts the associated control circuit when the buffer 119 occupies its extreme uppermost and innermost position, and a similar interlock 135 interrupts the associated control circuits when the buffer occupies its outer and lowermost positions. For intermediate positions, interlocks 134 and 135 remain closed.

A track limit switch 136 interrupts the associated control circuit when the device 118 is moved to its extreme outermost position or to its position away from the car. The remainder of the control circuits here shown are associated with certain other portions of the car-handling system and will be described in detail when the operation of the system is described.

Figure 6:
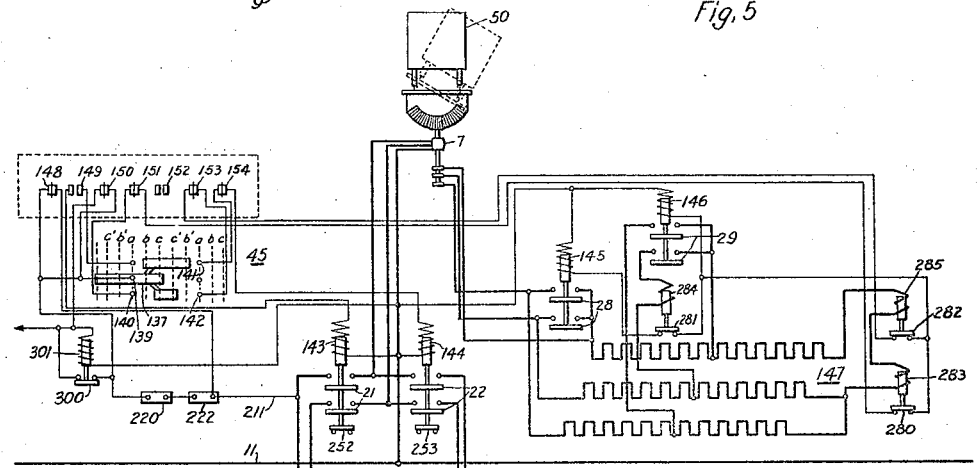
Figure 7:
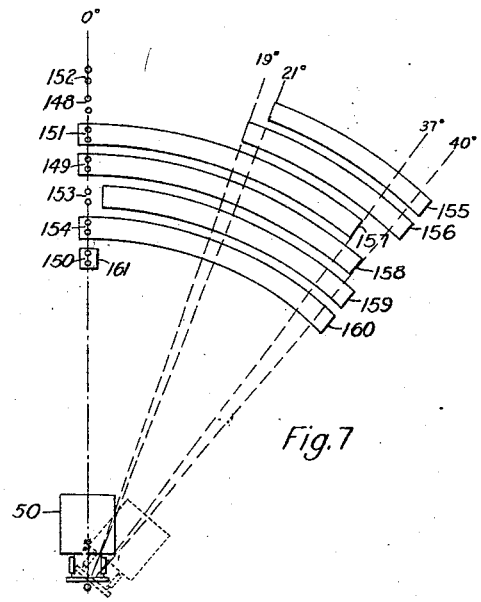

Referring particularly to Fig. 6 of the drawings, the motor 7 tilts the car 50 laterally to such degree as to discharge the contents of the car or to facilitate the loading of material into the car.

The operation of the motor 7 is controlled by the master switch 45 which has a contact segment 137 that engages contact fingers 138 to 142, inclusive, to energize coils 143 and 144 of the respective double-pole directional switches 21 and 22 and the actuating coils 145 and 146 of the respective accelerating switches 28 and 29. The latter switches close to successively shunt portions of the resistor 147 to control the speed of operation of the motor 7.

A plurality of geared interlock switches 148 to 154, inclusive, are mechanically operated by the motor 7, in such manner as to automatically control the degree to which the car may be laterally tilted by the motor.

Fig. 7 of the drawing illustrates schematically the geared interlock switches and their operation in accordance with the degree of tilt that is imposed upon the car 50 which is shown in dotted outline in its extreme tilted position.

For the purpose of illustration, it is assumed that pairs of contact fingers 148 to 154, inclusive, which bear numerals according to the numerals of the respective geared interlock switches shown in Fig. 6 which they represent, move in accordance with the degree of tilt of the car 50 in such manner as to engage co-operating stationary contact segments 155 to 161, inclusive.

The dotted radial lines, respectively designated 0°, 19°, 21°, 37° and 40°, indicate the portions of the stationary contact segments that engage the corresponding pairs of movable contact fingers when the car 50 is tilted through the designated angles. The line 0° indicates the position of the contact fingers when the car is in its normal upright position, and the line 40° indicates the positions of the movable contact fingers for the extreme laterally tilted position of the car, as illustrated by the dotted outline thereof.

Attention is directed to Fig. 8 of the drawing which illustrates a pair of end posts 161 and 162 that are positioned under the respective ends of the table 51, and a device that is operated by the motor 8 for longitudinally rocking the car 50 from end to end to facilitate the unloading thereof.

The unbalanced distribution of weight imposed upon the table when a loaded car, such as car 50, is moved to position thereon preparatory to being unloaded, renders it advisable to support the respective ends of the table by end posts 161 and 162 in order that the table may be properly positioned and the actuating mechanism relieved of unnecessary and excessive strains.

Each of the end posts 161 and 162 is latched in position by an electromagnetic latching device 163 and 164 which respectively have actuating coils 165 and 166 which, when energized, release the end posts 161 and 162.

A pair of interlock switches 167 and 168 are controlled in accordance with the presence or the absence of end post 161 from its bracing position, and an interlocking switch 169 is operated in accordance with the presence or absence of the end post 162.

The operation of the motor 8 is controlled by the master switch 46, which effects the closure of switches 23 to 36, inclusive, in accordance with a given sequence of operation. The master switch 46 has a contact segment 170 that engages contact fingers 171 and 172 to complete energizing circuits for actuating coils 173 and 174 of the respective directional switches 23 and 24. The contact segment 170 of the master switch 46 also engages contact fingers 175 to 180, inclusive, to effect the operation of the circuit-changing switches 30, 31 and 32 and the accelerating switches 33 to 36, inclusive, by energizing their respective actuating coils 181 to 187, inclusive. The switches 33, 34, 35 and 36 close to gradually shunt portions of a resistor group 188 from the secondary circuit of the winding of motor 8.

A control push-button switch 189 is adapted to shunt portions of certain interlocking circuits in order to "spot" the table 51 to its proper position relative to the associated track system.

An auxiliary switch 190, which has an actuating coil 191, closes to complete a circuit for an electromagnet brake winding 192 which arrests the operation of the table 50 under predetermined operating conditions.

A set of geared limit switches 193 to 198, inclusive, are mechanically connected to the motor 8 in such manner that the several switches are operated in accordance with the position of the table 51.

Reference is now made to Fig. 9 of the drawings. For the sake of clearness in illustrating the operation of the system, it is assumed that a plurality of pairs of movable contact members 193 to 198, inclusive, which bear numerals corresponding to the numerals of the respective geared limit switches of Fig. 8 which they represent, move across the surface of a plurality of stationary contact segments 199 to 204, inclusive, in accordance with the degree of longitudinal tilt of the car 50 to complete or to interrupt certain control circuits in such manner as to automatically control the longitudinal tilting operation of the car 50. The car 50 is shown in dotted outline in Fig. 9 in its extreme longitudinally-tilted positions.

The remaining detail control apparatus and portions of the system will be included in the description of the operation of the system.

In order to simplify the description of the operation of the system, the control circuits are separated from the main circuits, which they severally control, and the operation of each portion of the system is explained in accordance with the sequence of operation of the various stages in the operation of the system.

The master switches 39 to 46, inclusive, respectively have an "off" position that is designated $a$, a forward operating position that is designated $b$, and a reverse operating position that is designated $b'$. The master switches 45 and 46 have additional high-speed, forward and reverse operating positions respectively designated $c$ and $c'$.

Fig. 10 of the drawings illustrates the control circuits for the main line switch 12, for the portion of the system for controlling the shuttle car 49 and for the portion of the system for operating the clamps that secure the car 50 to the table 51. The control circuits are energized from main line conductors 10 and 11 through energizing conductors 210 and 211.

Reference is now particularly made to that portion of Fig. 10, which illustrates the circuit for controlling the operation of main line switch 12 to supply energy to the system, and to Fig. 2 of the drawings. The main line switch 12 is closed by depressing "start" push-button switch 37 which completes a circuit that extends from energizing conductor 210 through coil 52, the overload relay 53, push-button switches 38 and 37, contact finger 64, contact segment 63 and contact finger 67 of master switch 39, and contact finger 76, contact segment 73 and contact finger 80 of master switch 40 to conductor 211. When switch 12 closes, it establishes a holding circuit extending from conductor 210 through actuating coil 52, overload relay 53, "stop" push-button switch 38 and interlock 54 to conductor 211.

It will be seen from the respective positions of contact fingers 64, 67, 76 and 80 that the corresponding master switches 39 and 40 must occupy their "off" positions before the line switch can be closed. If the master switches 39 and 40 are in other than their "off" positions, the circuit for primarily energizing the actuating coil 52 is not completed when push-button switch 37 is depressed to start the system.

The directional switches 17 and 18 respectively control the forward and reverse directions of operations of the motor 1 which actuates the shuttle car 49. The switches 17 and 18 are controlled by the master switch 39.

When it is desired to advance a car, such as car 50, to the unloading zone, which is indicated by the table 51, the master switch 39 is moved to position $b$, which corresponds to the forward direction of operation of the motor 1. A circuit is completed from conductor 210, through actuating coil 57 of directional switch 17, track limit switch 70, contact finger 65, contact segment 63 and contact finger 64 of master switch 39, to conductor 211. The closing of switch 17 causes the motor 1 to operate the shuttle car 49 in a forward direction to advance the same to engagement with the car 50, which it is desired to move to position in the unloading zone.

When master switch 39 occupies position $b$, an additional circuit is established from conductor 210, through actuating coil 61 of accelerating switch 27, an accelerating relay 213 that closes when the secondary motor current decreases to a predetermined small value, contact finger 66, contact segment 63 and contact finger 64, to conductor 211.

As soon as the current traversing the actuating coil 214 of the relay 213 decreases to a predetermined value, the relay closes to complete the circuit for actuating coils 61 of accelerating switch 27.

When switch 27 closes, the current traversing the starting resistor 62 increases and the relay 215, which has a current actuating coil 216, is held open until the current again decreases to a predetermined value. When the current traversing the resistor 62 again decreases to a predetermined value, the accelerating relay 215 closes to complete an energizing circuit for coil 60 of switch 26, which extends from conductor 210, through actuating coil 60 of switch 26, an auxiliary push-button switch 219, current relays 215 and 213, contact finger 66, contact segment 63 and contact finger 64, to conductor 211.

The remaining accelerating switch 25 closes when a relay 217, which has a current coil 218, closes to establish a circuit from conductor 210, through actuating coil 59 of switch 25, current relays 218 and 213, contact finger 66, contact segment 63 and contact finger 64, to conductor 211. When the switch 25 closes, the motor is connected for its highest rate of speed in its forward direction of operation.

When the car 49 is in a position to engage the car 50, further movement of the car is arrested by returning the master switch 39 to its "off" position indicated by dotted line $a$. In this position of the master switch, the energizing circuits for the actuating coils of the switches 17, 18, 25, 26 and 27 are interrupted at contact fingers 65 and 66.

If the master switch 39 is now moved to position $b'$, which corresponds to the reverse direction of operation of the motor 1, the car 49 advances toward the car 50 and a pivotally mounted arm 212, that is mounted on the shuttle car 49, engages the car 50 to move the same in the direction of the unloading zone.

When the master switch 39 is in position $b'$, a circuit is completed to close switch 18 which extends from conductor 210 through actuating coil 58 of switch 18, track limit switch 71, contact finger 68, contact segment 63, and contact finger 64 to conductor 211. A circuit for controlling accelerating switches 25, 26 and 27 is completed from conductor 210 through actuating coil 61, accelerating relay 219, which has a current coil 220, contact finger 69, contact segment 63, contact finger 64 to conductor 211. Switches 25, 26 and 27 close successively to gradually shunt portions of the resistor 62 from the motor circuit in substantially the manner described for position $b$ of the master switch 39.

Since the effort required to initially move the car 50 is considerably greater than the effort necessary to actuate the car after movement is initiated, special provision, in the form of an auxiliary push-button switch 219, is made for obtaining maximum torque from the motor 1 when the car 49 engages the car 50 and both are at standstill.

Fig. 11 of the drawings is a speed-torque diagram of a wound-rotor type of induction motor that embodies a series of curves $e$, $f$, $g$ and $h$ that respectively correspond to the speed and torque relations for the motor 1, with the resistor 62 included in the secondary circuit and with the switches 25, 26 and 27 respectively closed to shunt the corresponding portions of the resistor 62 from the secondary circuit of the motor windings. Curve $g$ of the diagram indicates that the maximum torque of the induction motor, when the motor is at zero speed, is obtained when the accelerating switch 27 is closed.

Attention is again directed to Fig. 10 of the drawing in which is illustrated the auxiliary push-button switch 219 which controls switch 27 to obtain the maximum torque from the motor 1 when the motor is at zero speed. The master switch 39 remains in position $b'$ and the push-button switch 219 is depressed to complete a circuit from conductor 210, through actuating coil 61 of switch 27, and push-button switch 219, to conductor 211. The closing of switch 27 imposes maximum torque upon the motor 1 and initiates the movement of the car 50 toward the unloading zone.

The push-button switch 219 is arranged to interrupt the energizing circuit of actuating coil 60 of switch 26 to prevent switches 25 and 26 from closing to further accelerate the motor. When the car 50 begins to move, the operator releases the push-button 219 to effect the acceleration of the motor 1 by the successive closure of switches 25, 26 and 27 in the manner hereinbefore described.

The momentum of the car 50 is relied upon to bring it to the proper position on the table 51, after returning the master switch 39 to position $a$ which is the "off" position. The car-brakes are applied to stop at the desired position.

If, for any reason, the master switch 39 remains in position $b$ a sufficient time for the shuttle car 49 to engage track limit switch 70, the energizing circuit for the directional switch 17 is interrupted by the track limit switch 70, and further movement of the shuttle car 40 in its forward direction of travel is arrested. If the master switch 39 be now moved to position $b'$, which corresponds to the reverse direction of operation of the shuttle car 49, the shuttle car will return to its zone of operation between track limit switches 70 and 71 and, in passing track limit switch 70, closes the same to again establish normal operating circuit relations.

If the shuttle car 49 is operated to a point beyond the track limit switch 71, it effects the opening of the track limit switch 71 to interrupt the energizing circuit of actuating coil 58 of the directional switch 18. This arrests further movement of the car 49 in the reverse direction of travel. The return of the car 49 closes switch 71 to re-establish normal operation of the system.

After the car 50 is moved to position on the table 51, the pairs of end clamps 72 and side clamps 90 and 91 are operated to secure the car firmly to the table 51.

Attention is now invited to Fig. 3 and Fig. 10 of the drawings. The operation of end clamps 72 is controlled by master switch 40. In order to clamp the car, the master switch 40 is moved to position $b$ which corresponds to the forward operating position for motor 2. A circuit is established from conductor 210, through actuating coil 84 of directional switch 19, current limit relay 86, contact finger 82, contact segment 75 and contact finger 79 of the master switch 40, geared interlock switches 117 and 115 that are respectively closed when the side clamps 90 and 91 occupy their extreme outermost positions, track limit switch 136, that is closed when the door opening device is in its extreme outermost position, geared interlock switch 150 that is closed when the table 51 is in its normal upright position, as indicated in the diagram of Fig. 7, and end post interlocks 167 and 169, to conductor 211. The above traced circuit energizes actuating coil 84 to effect the closing of switch 19 to operate the motor 2 in a direction to draw the clamps 72 to position against the ends of the car 50.

The operation of the motor 2 continues so long as the current traversing the motor circuit is less than a predetermined maximum value. When the clamps 72 engage the respective ends of the car 50, the increased load imposed on the motor 2 causes the current traversing the motor circuit to increase in accordance with the clamping pressure. The ultimate pressure exerted by the clamps is determined by the setting of the relay 86, in such manner that a predetermined maximum value of current trips the relay 86 to disconnect the motor from the main line conductors when the desired degree of pressure is obtained.

If satisfactory clamping of the car is obtained by the above-described operation, the master switch 40 is left in position "$b$" and the normal sequence of operation of the system is proceeded with. If, however, the operator desires to reset the clamps 72, the current-limit relay is first reset by returning master switch 40 to position $a$ which completes a circuit from conductor 210, through the reset coil 88, the current-limit relay 86, and contact finger 83, to the energized contact segment 75. The coil 88 effects the resetting of current-limit relay 86 and re-establishes the circuit relations as shown in the drawing.

If, from this position, it is desired to release the clamps 72, the master switch 40 is moved to position $c$ which corresponds to the reverse direction of operation of the motor 2. In this position of the master switch a circuit is established from conductor 210, through actuating coil 85, track limit switch 89 of the end clamps 72, and contact finger 78, to the energized contact segment 75. The closing of switch 20, which is effected by the energization of coil 85, connects the motor 2 for operation in the reverse direction to release the clamps 72.

If the master switch 40 remains in position $c$ a sufficient time to permit clamps 72 to return to their extreme outermost positions, the track limit switch 89 operates to interrupt the circuit for actuating coil 85 to disconnect the motor 2 from the line conductors.

The motor 2 may, from this final position and from any intermediate position, be again operated in a forward direction by returning the master switch 40 to position $b$ as hereinbefore described.

It is necessary that the master switch 40 remain in position $b$ when proceeding to the next step in the operation of the system which consists in adjusting the sets of clamps 90 and 91 to their respective clamping positions.

The pair of side clamps 90 respond to the operation of master switch 41 in such manner that, when the master switch 41 is moved to position $b$, which corresponds to the forward direction of operation of the motor 3, the clamps move to engagement with the car.

The operation of motor 3 depends upon the closing of the switch 19 and its subsequent opening by the current limit relay 86. When the switch 19 is initially closed to operate the end clamps 72, a circuit is completed from conductor 210 through interlock 225 of the switch 19, interlock 226 which is mechanically connected to switch 13 and is closed when switch 13 is opened, interlock 227 of switch 14 which is closed when the switch 14 is opened, through actuating coil 228 of a relay 229 to conductor 211.

The closing of relay 229 completes a circuit from conductor 210, through relay 229, interlock 226 of switch 13, interlock 227 of switch 14, and actuating coil 228 of relay 229, to conductor 211. When the current-limit relay 86 effects the opening of switch 19, interlocks 230 and 231 complete a circuit to close relay 232 which extends from conductor 210, through relay 229, interlocks 230 and 231 of switch 19, interlock 233 of switch 20, and actuating coil 234 of relay 233, to conductor 211. When relay 232 closes it establishes a circuit from conductor 210, through relay 232 and conductor 235, to one side of the respective actuating coils 99 and 110 of switches 13 and 14.

If it is now desired to operate the pair of clamps 90, the master switch is moved to position $b$ which corresponds to the first position of the master switch for forward operation of the motor 3. In this position of the master switch 41, a circuit is established from conductor 210 through relay 232, conductor 235, actuating coil 99 of auxiliary line switch 13, current-limit relay 100, contact finger 95, contact segment 94 and contact finger 96 of master switch 41, conductor 244, contact finger 77, contact segment 74 and contact finger 81 of the master switch 40, which is assumed to be in position $b$, conductor 245, geared interlock switch 150, that is closed when the table 51 is in its normal upright position, as indicated in the diagram of Fig. 7, and end post interlock switches 167 and 169 to conductor 211.

If attention is also temporarily directed to Figure 4 of the drawings it will be noted that the closing of switch 13, by the energization of actuating coil 99 by the circuit just traced, completes a main circuit for the motor 3 from main line conductors 10 and 11, through double-pole auxiliary line switch 13, current actuating coils 101 and 102 of the current limit relay 100, control fingers 236 and 237, the respective contact segments 92 and 93 and associated contact fingers 238 and 239, to the motor 3. The above-traced main circuit supplies energy to the motor 3 to effect the movement of the clamps 90 to position against the car 50. The overload relay 100 operates in a manner similar to that of the relay 86, hereinbefore described, to impose a predetermined clamping pressure against the sides of the car 50. When, by reason of the increased load current supplied to the motor 3, the relay 100 opens to de-energize the actuating coil 99 of switch 13, a predetermined clamping pressure is obtained, and the motor is disconnected from the main line conductors 10 and 11 by the opening of the switch 13.

If the clamping of members 90 is satisfactory to the operator, the normal sequence of operation may be continued through adjusting clamps 91 in a manner similar to that described for the pair of clamps 90. If, however, the operator desires to release clamps 90, the motor is operated in the reverse direction by moving the master switch 41 to the "off" position, which is designated "$a$" in the drawing, to reset the current-limit relay 100 by energizing the reset coil 103 by means of a circuit that is completed from conductor 235, through reset coil 103, current-limit relay 100 in its open position, and contact finger 98, to the energized segment 94 of master switch 41.

If master switch 41 be now moved to position $c$, which is the initial operating position for reverse direction of operation of the motor 3, the main line conductors 10 and 11 will be respectively connected to the motor 3 through contact fingers 36 and 37 of the master switch 41 and the respective segments 92 and 93. If the motor 3 is allowed to operate the clamps 90 to their extreme outermost positions, the geared limit switch 114 interrupts the control circuit for actuating coil 99 of switch 13 to disconnect the motor from the main line conductors 10 and 11.

The pair of clamps 91 are operated in substantially the same manner as that described for the pair of clamps 90 and, since the equipment corresponds, in every detail, to the equipment for operating the clamps 90, further description of the operation of the clamps 91 is deemed unnecessary.

When proceeding from this point in the operation in the system to subsequent stages, it is necessary that the master switches 41 and 42 remain in their respective forward position, designated $b$ in the drawings, in order that the proper control circuits may be established.

Reference is now made to Fig. 12 of the drawing which illustrates the control system for operating the door-opening device and the mechanism for tilting and rocking the cradle 51. After the car 50 is rigidly clamped to the table 51, the door-opening device 118 is moved forwardly to open the car door by the operation of the motor 5 which is controlled by master switch 43.

Before proceeding further with the description of the operation of switches 15 and 16 of the control system for the door-opening device 118, the interlocking circuits, or the circuits that must be established before the respective actuating coils 126 and 133 may be energized, will be described.

After the system has operated to clamp the car 50 to the table 51 by means of the respective pairs of clamps 72, 90 and 91 an interlocking control circuit is established from conductor 210, through relay 232, to conductor 235 of Fig. 10 to the similarly designated conductor 235 in Figure 12 of the drawings. The continuation of energizing conductors 210 and 211 and interlocking conductors 244 and 245 from Fig. 10 to Fig. 12 is similarly indicated.

Referring particularly to Figs. 5 and 12 of the drawings, an interlocking circuit is continued from conductor 235 through interlocks 250 and 251 of respective side-clamp controlling switches 13 and 14, interlocks 252 and 253 of directional switches 21 and 22 that respectively control the operation of the side-tilting motors, interlocks 254 and 255 of the respective switches 16 and 15, which control the supply of energy to motors 6 and 5 of the door-opening device 118, and actuating coil 256 of a relay 257 to the positively energized conductor 245 of Fig. 10, which is energized from conductor 211 by the geared limit switch 150 and end post interlock switches 167 and 169, as hereinbefore described.

The energization of the coil 256, by means of the above-traced circuit, closes relay 257 to bridge interlocks 250 and 251. The circuit thus established extends from the negatively energized conductor 235, through relay 257, interlocks 252 to 255, inclusive, and the actuating coil 256 of relay 257, to the above-traced positively-energized conductor 245. The preceding circuit constitutes a holding circuit for the relay 257.

The completion of the interlock circuits described in the two preceding paragraphs depends upon the closing and the subsequent opening of switches 13 and 14 by the current-limit relays 100 and 111. The switches 13 and 14, when opened by the current-limit relays after the above-traced interlocking circuits are established, further completes a circuit from conductor 235 through relay 257, interlocks 258, 259, 260 and 261, of switches 13 and 14 that are assumed to now be open, and actuating coil 262 of a relay 263 to the positively-energized conductor 245.

The energization of the coil 262 effects the closing of relay 263 to complete a circuit from conductor 235 through relay 263 and conductor 264 to one side of a relay 265. The relay 265 has an actuating coil 266 that is connected to the energized conductor 235 and to a contact finger 95 that engages the contact segment 94 to complete a circuit to the positively-energized conductor 245.

Since it is assumed that the master switches 41 and 42, which control the operation of the side bolster motors 3 and 4, remain in positions b, their forward operating positions, when proceeding to the subsequent steps in the operation of the system, the relay 265 is closed. The circuit which includes conductor 264 is, therefore, continued through relay 265 and relay 266, which has an actuating coil that is energized from contact segment 105 of master switch 42, to conductor 268. The closing of the relay 266 energizes conductor 268 from conductor 235 through a circuit that includes relays 263, 265 and 266.

From the above-traced circuit, it will be understood that the operation of switches 15 and 16, which control the motors for operating the door-opening device, depends upon the closing and the subsequent opening of switches 13, 14 and 19 by the respective current-limit relays 100, 111 and 86 while the master switches 41 and 43 remain in their respective forward positions.

When the operator moves the master switch 43 to position b, which corresponds to the initial forward operating position for moving the door-opening device 118 to its door-engaging position, the circuit traced to conductor 268 is continued, through actuating coil 126 of auxiliary line switch 15, contact finger 123, contact segment 122 and contact finger 124 of master switch 43, to the negatively energized conductor 245.

The closing of switch 15 completes a main circuit, which may conveniently be traced in Figure 5, from the main line conductors 9, 10 and 11, through double-pole auxiliary line switch 15, contact fingers 270 and 271, contact segments 272 and 273 and contact fingers 274 and 275 of the master switch 43, to the windings of motor 5.

When the door-opening device 118 is moved to the proper position with respect to the car door, the master switch 43 is returned to its position a to arrest further operation of the motor 5. If the position of the device 118 is satisfactory to the operator, he proceeds with the operation of the remaining stages of the system.

If, however, the door-opening device 118 is not positioned to suit the operator, the master switch 43 may be moved to position b' to operate the motor 5 in a reverse direction.

For position b' of the master switch 43, the control circuit continues from conductor 268, through the actuating coil 126 of auxiliary line switch 15, the track limit switch 136 of the door-opening device and contact finger 125, to the positively energized contact segment 122 of the master switch 43.

When the door-opening device 118 reaches its outermost position, the track limit switch 136 operates to interrupt the circuit of the actuating coil 126 to arrest further operation of the motor 5.

Master switch 43 may again be moved to position b to effect the movement of the door-opening device 118 to a position such that it may engage the car door. After the door-opening device is positioned to suit the operator, the master switch 43 is returned to position a to arrest further operation of the motor.

The operator now moves the master switch 44 to position b, to complete a circuit from the negatively energized conductor 268, through actuating coil 133, of auxiliary line switch 16, geared interlock switch 134, which is operated by the buffer 119, contact finger 130, contact segment 129 and contact finger 131 of the master switch 44, to the positively energized conductor 245.

The energization of coil 133 of switch 16 effects the closing of switch 16 to complete a circuit for the motor 6, which extends from main line conductors 9, 10 and 11 through the double-pole auxiliary line switch 16, contact fingers 274 and 275, contact segments 127 and 128 and contact fingers 276 to the windings of the motor 6. When the above-traced circuit is completed, the motor 6 operates to lift the buffer 119.

Since, in grain cars and the like, the doorway of the car is closed by a set of planks that is held against the inner framework of the doorway by the contents of the car, the outside of the car is first opened in the usual manner and the studded buffer 119 is then moved to engage the set of planks that close the door opening. When the buffer 119 is moved upwardly, the projecting studs of the buffer engage the planks which close the car door to lift the planks from their respective positions and to move the entire body of planks upwardly as the buffer is lifted by the motor 6. In this manner, an opening is provided below the planks through which the grain in the car may be spilled.

When the buffer 119 reaches its extreme uppermost position, the geared interlock switch 134 interrupts the energizing circuit for the coil 133 to arrest the operation of the motor. In this manner, the operation of the buffer 119 is automatically controlled by the geared interlock switch 134. If the car door is satisfactorily opened, the operator proceeds to tilt the car laterally to discharge the grain through the open doorway mechanism.

If, by reason of the slipping of the studded buffer over the surface of the planks, or for other causes, the operation of the buffer 119 does not open the car door, the operator may again back the device 119 away from the car door in the manner hereinbefore described and return the buffer 119 to its lowermost position by moving the master switch 44 to position $b'$ which corresponds to the position for reverse direction of operation of the motor 6.

When the master switch 44 is in position $b'$, a circuit is completed from the conductor 268, through the actuating coil 133, the geared limit switch 135, contact finger 132, contact segment 129 and contact finger 131, to the energized conductor 245. The contact segments 127 and 128 reverse the direction of operation of the motor 6 when the master switch is in position $b'$. The operation of the motor 6 in the reverse direction continues until the buffer 119 moves to its lowermost position, at which point the geared limit switch 135 interrupts the energizing circuit of coil 133 to prevent further operation of the motor 6.

From this position, the door-opening device 118 may be readjusted by means of the master switch 43, to establish more satisfactory engagement of the buffer 119 with the planks which close the car doorway, or to obtain other advantages, and the master switch 44 may be operated to again lift the buffer 119 to move the planks so as to provide an opening through which the contents of the car may be discharged.

If it is now assumed that the car door has been properly opened, the next step in the operation of the system is to tilt the car laterally by operating motor 7. The circuit which controls the closing of directional switches 21 and 22 is continued from the negatively energized conductor 268 through the respective actuating coils 143 and 144 of the directional switches 21 and 22.

The operator moves the master switch 45 to position $b$ to tilt the car forwardly. This action completes a circuit from the negatively-energized conductor 268, through actuating coil 143, geared limit switch 149, which is shown closed by contact segment 158 in Fig. 7, contact finger 138, contact segment 137, and contact finger 139 of the master switch 45, and end post interlock switches 220 and 222, to the positively energized conductor 211.

The closing of switch 21 connects the motor 7 to main line conductors 9, 10 and 11 to operate the motor 7 in a direction to tilt the car 50 forwardly. The rate of acceleration of the motor 7 is controlled by a series of accelerating switches 28 and 29, the sequence of operation of which is governed by accelerating relays 280, 281 and 282, that respectively have series actuating coils 283, 284 and 285.

In position $b$ of the master switch 45, a circuit is also completed from the conductor 268 through actuating coil 146 of accelerating switch 29, accelerating relay 280, which controls the value of current at which the switch 29 is permitted to close, the geared limit switch 151, which is indicated as closed in Fig. 7 of the drawing, and the contact finger 140 to the positively energized contact segment 137 of master switch 45. As soon as the current traversing the current coil 283 of the relay 280 drops to a predetermined minimum value, the above-traced circuit is completed to close switch 29 which shunts a portion of the resistor 147 from the secondary circuit of the induction motor 7.

When the switch 29 closes, the current traversing the secondary motor winding consequently increases to a value which maintains relay 281 open until the current traversing series coil 284 of relay 291 decreases sufficiently to permit the relay to close. A circuit is thus established from the negatively-energized conductor 268, through actuating coil 145 of switch 28, relays 281 and 280, the geared limit switch 151 and contact finger 140, to the positively energized contact segment 137. When the switch 28 closes, the motor 7 operates at its highest speed to tilt the car 50 laterally.

Reference is now also temporarily invited to Fig. 7, in addition to Figs. 6 and 12, which indicates the series of contact segments that are assumed to move in accordance with the degree of tilt of the car to establish certain interlocking circuits.

When the car 50 is tilted laterally through approximately 19°, the contact segment 156 engages the contact members of the geared interlock switch 148 to complete a circuit from the positively-energized conductor 211, shown in Fig. 10, through interlock switch 148 and contact finger 139 to positively energize the contact segment 137 of master switch 45 by a circuit in shunt relation to the end-post interlock switches 220 and 222, for a purpose to be hereinafter set forth.

When the degree of tilt of the car 50 increases to 37°, the circuit established by the geared limit switch 151 is interrupted to reinsert the resistor 147 in circuit with the secondary motor winding by interrupting the energizing circuits for coils 145 and 146 of the respective accelerating switches 28 and 29. This reduces the speed of the motor 7 in its operation of tilting the car 50, to its minimum operating speed.

When the car reaches the extreme laterally tilted position of substantially 40°, the circuit established by the engagement of the geared limit switch 149 with contact segment 158 is interrupted to arrest further operation of the motor by interrupting the energizing circuit for coil 143 of directional switch 21.

From the above description, it will be understood that the control system automatically arrests further motion of the car when it is tilted laterally through the desired angle. It should also be pointed out that the operator may control the car to arrest its degree of tilt at any intermediate point by returning the master switch 45 to its initial operating position $a$, in which position the energizing circuit for coil 143 of switch 21 is interrupted at the control finger 138.

The operator usually proceeds from this stage in the operation of the system to the subsequent rocking of the car 50 in an approximately vertical plane but he may, if he so desires, return the car to its normal upright position by moving the master switch 45 to position $b'$, as hereindescribed in relation to the handling of the car after its unloading has been effected.

When the car 50 is tilted substantially 21°, the geared limit switch 152 closes, as indicated in Fig. 7, to complete a circuit from conductor 210, through the end post latching coils 165 and 166 and geared limit switch 152, to conductor 211. The energization of coils 165 and 166 releases the end post latches 163 and 164 which respectively permit of the removal of the end posts 161 and 162. The removal of the end posts 161 and 162 operate the end-post relay switches to close switches 167, 168, 169 and 221, as indicated in Fig. 8 of the drawings, and to open switches 220 and 222.

If, after laterally tilting the car 50 to its extreme laterally-tilted position of substantially 42°, or to some point intermediate the 21° position and the extreme position, the operator desires to proceed with the subsequent stages in the operation of the system, he removes the end posts 161 and 162 and rocks the car longitudinally from end to end to spill its contents.

Reference is now made to Figs. 8 and 12 of the drawings. It is assumed that the operator has tilted the car laterally to its extreme position, or to some position intermediate 21° and 42° of tilt, and has removed the end posts 161 and 162 preparatory to longitudinally rocking the car 50.

The contact segment 170 of the master switch 46 is energized from a contact finger 177, the circuit for which is completed by a relay 300 which has an actuating coil 301. The relay 300 is closed by the energization of coil 301 by a circuit which extends from conductor 210 through coil 301, the contact finger 180, the end-post interlock switches 167 and 169, that are respectively closed by the removal of the end posts, and the geared limit switch 152, that is closed when the car is laterally tilted more than 21° to conductor 211.

When the relay 300 closes, it establishes a circuit which bridges the end post interlock 167 and the contact finger 180 to complete an energizing circuit for the contact segment 170 which extends from the positively-energized conductor 211 through geared interlock switch 152, the end post interlock switch 169, relay 300 and the contact finger 167 to positively energize the control segment 170.

A holding circuit for the relay 300 is also established by the closure of the relay which extends from the negatively energized conductor 210 through the actuating coil 301 of the relay 300, to the positively energized contact finger 177 of the master switch. From the above traced circuit, it will be understood that, after the relay 300 is closed, the end-post interlock switch 167 has no further effect upon the energization of the contact segment 170.

When the operator desires to tilt the car longitudinally, he moves the master switch 46 to position b, which corresponds to low-speed operation of the motor 8.

When the master switch 46 is moved to forward operating position b, the brake magnet winding 192 is energized to release the brake for the motor 8 by a circuit that is completed from conductor 210 through the actuating coil 191 of the brake relay 190, the geared limit switch 195 which is closed by engagement with the contact segment 202, as illustrated in Fig. 9 of the drawings, the end-post interlock switch 221 and the contact finger 175 to energized contact segment 170 of the master switch 46.

The energization of the actuating coil 191 of the brake relay 190 completes a main circuit for the brake winding 192 which extends from the main line conductor 9 through the brake relay 190 and the brake magnet winding 192 to the main line conductor 10.

For position b of the master switch 46, a circuit is also established from conductor 210 through actuating coil 173 of directional switch 23 and contact finger 171 of the master switch 46 to the energized contact segment 170. The above traced circuit effects the closing of the directional switch 23 to operate the motor 8 in the forward direction.

An additional circuit is completed from conductor 210, through the actuating coil 181 of the low-speed switch 30, interlocks 302 and 303, that are mechanically connected to the high-speed switches 31 and 32 in such manner that the respective interlocks are closed when the corresponding high-speed switches are open, through a double-throw speed-changing relay 304, the geared limit switch 195, which is closed by the contact segment 202 for all longitudinal positions of the car 50, excepting the extreme position in the forward direction of tilt, as indicated in Fig. 9 of the drawings, through end-post interlock switch 221 that is closed by the removal of end post 162, and the contact finger 175, to the energized contact segment 170. This circuit closes low-speed switch 30 to connect main line conductors 9, 10 and 11 through the directional switch 23 and the low-speed switch 30 to the terminals of the winding of motor 8.

The sequence of operation of the accelerating switches 33 to 36, inclusive, is controlled by a plurality of the accelerating relays 305 to 309, inclusive, which respectively have current actuating coils 310 to 314, inclusive.

The energizing circuit for coil 181 divides and extends through the accelerating relay 305 and the coil 184 of the accelerating switch 33 to connect the coil 184 and relay 305 in parallel relation with the coil 181 of the low-speed switch 30. The successive operation of the relays 305 to 308, inclusive, energizes the coils 184 to 187 of the accelerating switches 33 to 36, inclusive, to gradually exclude resistor 188 from the secondary circuit of the windings of motor 8 in a manner that is familiar to those skilled in the art, and, since this is not an essential feature of the invention, it is deemed unnecessary to further decribe the details of such operation.

If the operator desires to further accelerate the speed of operation of the longitudinal tilting of the car, he moves the master switch 46 to position c, which corresponds to the position for high-speed forward operation of the motor. In this position, an additional circuit is completed from conductor 210 through the actuating coil 315 of the speed-changing relay 304, end-post interlock switch 168, that is closed when the end post 162 is removed, geared interlock switch 194, the circuit for which is completed by contact segment 199, as indicated in Fig. 9, and contact finger 176 to the energized contact segment 170. The energization of the actuating coil 315 effects the operation of the speed-changing relay 304 to interrupt the energizing circuit for coil 181 and the associated circuits for the actuating coils of the accelerating switches 33 to 38, inclusive. The operation of the speed-changing relay 304 also completes a circuit from the positively-energized conductor 299 through speed-changing relay switch 304 and an interlock 317 that is mechanically connected to the switch 30 in such manner that, when the switch 30 is open, the interlock 317 is closed, and the actuating coils 182 and 183 of the respective switches 31 and 32 grouped in parallel relation, to the negatively energized conductor 210. The closing of the high-speed switches 31 and 32 connects the windings of the motor 8 in such manner as to reduce the number of effective poles of the winding and to increase the motor speed.

The circuit just traced continues from the interlock 317 of switch 30 through accelerating relay 309 to the actuating coils 184 to 187, inclusive, of the various accelerating switches to effect the closing of the several switches to gradually exclude the resistor 188 from the secondary circuit of the motor winding. By including the interlock 317 of the switch 30 in the circuit of the actuating coils of the high-speed switches 31 and 32 and the accelerating switches 33, 34, 35 and 36, the operation of the high-speed switches is prevented until subsequent to the opening of the low-speed switch 30 and the successive closing of the accelerating switches is again initiated.

The motor 8 automatically accelerates to its highest rate of speed when the switches 31 to 36, inclusive, are closed.

The longitudinal tilting of the car 50 continues until the car is tilted to substantially 37°, at which point the circuit for the actuating coil 315 of the speed-changing relay 304 is interrupted by the disengagement of contact segment 199 from the contact members of the geared limit switch 194 to open switches 31 to 36, inclusive, and re-establish an energizing circuit for the coil 181 of the low-speed switch 30. This action effects the deceleration of the tilting of the car to low-speed operation.

Further progress of the car in the longitudinal tilting direction is arrested by the disengagement of contact segment 202 from the associated geared limit switch 195 to interrupt the energizing circuit of the coil 181 of the low-speed switch 30. The opening of switch 30, when the car attains its extreme forwardly tilted position of substantially 42°, interrupts the supply of energy to the motor and effects the application of the brake by de-energizing the brake-magnet winding 190 to positively arrest further motion of the car in the longitudinal tilting direction.

Operation beyond the extreme position of 42° is precluded by interlocking arrangements which effect the interruption of the circuits to the various low and high-speed switches to protect the car from operation which might prove hazardous and destructive to the apparatus.

The longitudinal tilting of the car, when the door is open and the car is tilted forwardly, more readily discharges the contents of the car into a bin which is incorporated as a portion of the receiving table 51.

In order to more effectively discharge the contents of the car, the operator successively rocks the car by moving the master switch for the first forward direction of operation of the motor and then for the reverse direction of operation. The rocking movement of the car is automatically arrested at its extreme positions by the series of geared limit switches and interlocking devices that are employed. In this manner, harm to the car-tilting mechanism is positively avoided.

When the operator desires to return the car in a reverse direction from the forward tilting position of 42°, as indicated by the dotted outline of the car in Fig. 9 of the drawings, he moves the master switch 46 to low-speed position $b'$. A circuit is completed which extends from conductor 210 through the actuating winding 191 of the brake relay 190, conductor 299, geared interlock switch 198 and contact finger 178 to the energized contact segment 170. The operation of the brake relay energizes the brake-magnet coil 192 to release the brake.

A circuit, which is also simultaneously established, extends from conductor 210 through the actuating coil 174 of the directional switch 24 which corresponds to the reverse direction of operation of the motor 8, and the contact finger 172 to the positively energized segment 170 of the master switch. The closing of the switch 24 effects the reversal of the direction of operation of the motor 8.

The circuit traversing conductor 299 continues through speed-changing relay 304, through interlocks 303 and 302 and the coil 181, to conductor 210. The circuit closes the low-speed switch 30 and initiates the acceleration of the motor in a reverse direction in substantially the manner set forth in relation to the forward direction of operation of the motor. As the reverse direction of operation of the motor continues, the high-speed pole-changing switches 31 and 32 and the accelerating switches 33 to 36, inclusive, successively operate to connect the motor for its highest speed of operation as hereinbefore described.

Since the load contained in one end of the car 50 has already been discharged through the doorway of the car, the remaining contents of the car greatly unbalance the weight of the car and it has been found desirable to decrease the speed of operation of the car at substantially 25° in the reverse direction instead of 37°, as explained in relation to the forward tilting operation.

When the car attains a reverse angle of tilt of substantially 25°, the geared interlock switch 197 disengages the contact segment 200 to interrupt the energizing circuit of the speed-changing relay 304 to effect the opening of the high-speed and the accelerating switches 31 to 36, inclusive, and to close the switch 30 to decelerate the motor 8 to its minimum speed of operation.

The geared interlock switch 198 disengages contact segment 203 when the car is longitudinally tilted through substantially 42° to the extreme reverse tilted position to interrupt the circuit of the actuating coil of the low-speed switch 30 and the circuit of the brake relay winding 191 to arrest further operation of the motor by disconnecting the same from the main line conductors and by applying the motor brake.

If the master switch 46 be now moved through positions $b$ and $c$, which correspond to the forward direction of operation of the motor, the table 51 will again be tilted to its extreme forward position by the automatic operation of the system. The end post 161 may now be replaced in position to engage the corresponding end of the table 51 when the same is moved to its normal horizontal position. The replacement of end-post 161 opens end-post interlock switches 167, 168 and 221 and closes end-post interlock switch 220.

For this stage in the operation of the system, the circuit for positively energizing the conductor 299 is completed by geared interlock switch 196, which is closed by engagement with contact segment 204 during the forward operation of the forward tilting of the car, and by the geared interlock switch 195, as hereinbefore described and indicated in Fig. 9 of the drawings. The circuit for the actuating coil 315 of the speed-changing relay 304 is completed through the geared limit switch 193 after the end-post 161 has been returned to its position under the end of the table 51.

When the car is returned in the reverse direction to substantially 8° forward longitudinal tilt, the contact segment 201 disengages the contact members of the geared limit switch 193 to interrupt the circuit for actuating coil 315 of the speed-changing relay 304. The de-energization of the relay actuating coil effects the interruption of the circuit for the actuating coils of the high-speed accelerating switches and establishes an energizing circuit for the actuating coil of the low-speed switch 30, in the manner hereinbefore described.

This action decelerates the return operation of the table 51 to its low-speed operation. The interlock 204 disengages the contact members of geared limit switch 196 as shown in Fig. 9, to interrupt the circuit and the low-speed switch 30, when the car is returned to substantially 3° forward tilt, in such manner that the operation of the table 51 is arrested and is firmly clamped by the brake-magnet winding 192 in a position slightly removed from the horizontal position. The operation of the table is arrested in this position in order to prevent damage to the system by the table violently striking the end-post 161 which, it is assumed, has been replaced under the end of the table.

If the master switch 46 is now left in its reverse operating position, and the push-button switch 189 depressed, the circuit of the actuating coil of the low-speed switch 30 is completed from the positively energized conductor 170, through contact finger 175, the push-button switch 189 and the geared limit switch 195, to the conductor 299. The push-button switch 189, therefore, constitutes a temporary means for "spotting" the table 51 to its normal position and provides a very sensitive means for controlling the table where it is desired to move the table a relatively small distance to adjust the same relative to the incoming tracks and to firmly rest the table upon the end-post 161.

The end-post 162 is now returned to its position beneath the table 51, and the car is returned to its normal upright position by operating the lateral-tilt master switch 45 to position $b'$ which is the position for effecting reverse direction of operation of the motor 7.

When the master switch 45 is in position $b'$, a circuit is completed from the negatively-energized conductor 268 through the actuating coil 144 of switch 22, the geared limit switch 154, and the contact finger 141 to the positively-energized contact segment 137. The closing of switch 22 effects the operation of the motor 7 in a reverse direction to return the car 50 to its normal upright position. The acceleration of the movement of the car is controlled by the switches 28 and 29, and the associated accelerating relays 281 and 282, in a manner similar to that described in relation to the forward operation of the motor.

As the car approaches its normal upright position, the circuit of the actuating coils of switches 28 and 29 is interrupted by the disengagement of the contact segment 159 with the contact fingers of the geared limit switch 153, as indicated in Fig. 7, to decelerate the motor. When the car 50 returns to its normal upright position, contact segment 160 of Fig. 7 disengages contact finger 154 to interrupt the energizing circuit of coil 144 of the directional switch 22 to arrest further operation of the motor 8.

From the above traced circuit, it will be noted, that the car may be returned to its normal upright position by the automatic operation of the various switches and relays.

After the car is returned to its normal upright position, the pairs of side clamps 90 and 91 and the end clamps 72 are released in order that the car may be removed from the unloading zone by the next loaded car, which pushes the empty car off. The several operations are accomplished in substantially the manner described for the unloading operations and it is, therefore, deemed unnecessary to repeat such description.

The emergency push-buttons 47 and 48 are provided for re-establishing certain of the interrupted interlocking circuits consequent to a failure of the energy that is supplied to the system or in case an attempt has been made to operate certain stages of the system out of their established sequence.

If it is assumed that the supply of energy to the system fails after the car is clamped to the table 51, by the clamp 72 or 90 and 91, the energizing circuits for the respective master switches may again be established by depressing push-button switch 47, which connects conductor 210 to the interlocking circuit 235 through depressed push-button switch 47 and push-button switch 48. This circuit effectively bridges the several interlocking relays shown and described in relation to Fig. 10 and Fig. 12, and permits of the operation of the master switches 40, 41 or 42 to proceed with the clamping or unclamping of the car 50.

If, however, the car is laterally tilted when the supply of energy through the system is interrupted, the switch button 48 may be depressed to energize the conductor 268 through depressed push-button switch 48 and also switch 47. In this manner, the said circuits are temporarily bridged by the push-button switch, and the respective relays are again energized and closed as described in connection with the normal operation of the system.

The arrangement of the push-button switches 47 and 48 is such that the associated circuits are singly responsive to the depression of either of the push-button switches but are not effected when both push-button switches are simultaneously depressed. This provides an effective electrical interlocking of the two push-button switches that may be applied to portions of other systems.

The particular function of loading or unloading material from the car is not material to the invention and, therefore, only the unloading operation is herein described. It will readily be understood that loading may be facilitated by employing the system described for unloading operations and introducing the materials into the car through the door that is uppermost when the car occupies its tilted position. The degree of tilt may be independently controlled and is found to be most satisfactory when the car is tilted laterally substantially 45°.

In the description of the operation of the car-handling system, it is assumed that the operator moves the respective master switches to their forward operating positions as the operation of the system advances through its several stages.

If, however, more rapid operation of the complete sequence is desired, the operator may simultaneously move the master switches 41 to 46, inclusive, to their extreme forward operating positions after the car is clamped to the receiving table. This manner of operation of the system demands, however, that the operator adjust the master switches 39 and 40 to properly clamp the car to the table 51, after which operation, the system automatically proceeds through its subsequent stages in substantially the manner described for the operation of each of the stages.

The return of the unloaded car to its upright position may also be automatically effected by simultaneously moving the master switches 41 to 46, inclusive, to their positions for reverse operation of the motors controlled thereby.

Although I have described my invention as applied to the unloading of a grain car or the like, it is wholly and partially capable of various other applications and, I desire, therefore, that only such limitations shall be imposed as are indicated by the spirit and scope of the appended claims.

I claim as my invention:

1. In a car-handling system, the combination with a car, and a car-unloading device, of a movable table, means for clamping said car to said table, means for tilting and rocking said table, means for returning said table and said car to their normal upright positions, means for automatically stopping said table short of said normal position, and means for effecting a relatively short additional movement thereof to normal position.

2. In a car-handling system, the combination with a car, a table, and clamps for securing said car to said table, of means for laterally tilting said car and for longitudinally rocking said car in its tilted position, and electrical interlocking means for insuring operation of said tilting means prior to said rocking operation.

3. In a car-handling system, the combination with a plurality of cars, a table, and a car-pulling device for successively placing said cars on said table, of electrical means for bodily tilting and rocking the car placed on said table, means for establishing an operating circuit for said system, and interlocks associated with said circuit-establishing means that are adapted to prevent the completion of said circuit when said clamping means and said car-pulling device are not in their respective "off" positions.

4. In a car-handling system, the combination with a car, a table, a car-pulling device for placing said car on said table, and a clamping device for rigidly securing said car to said table, of electro-responsive means for operating said system, and means associated therewith for preventing the operation thereof except when said clamping device and said car-pulling device occupy predetermined positions.

5. In a car-handling system, the combination with a car, a table, a car-pulling device for placing said car on said table, a clamp for securing said car to said table, and a master switch for controlling the supply of energy to said system, of means for interlocking said car-pulling device with said master switch and said clamping device to prevent the movement of said car-pulling device when said clamping device occupies a clamping position.

6. In a car-handling system, the combination with a motor operated table, a device for successively placing said cars on said table, a pair of clamps for engaging the ends of the positioned car, and a master switch for supplying electrical energy to said system, of means for interlocking said clamps, said car-placing device and said master switch to ensure a predetermined sequence of operation of said devices prior to operation of said table motor.

7. In a car-handling system, the combination with a table, a device for successively placing cars on said table, and a motor-operated clamp for securing said cars to said table, of interlocking means associated with the car-placing device for preventing the operation thereof when said master switch and said clamp occupy other than their "off" positions.

8. In a car-handling system, the combination with a car, and means for bodily tilting and rocking the car, of means for operating the door of said car and means for so interlocking said door-operating means with the remainder of the system as to ensure of operation of the door device prior to operation of said first means.

9. In a car-handling system, the combination with a car, a table, and means for clamping said car to said table, of motor-operated means for laterally tilting said car and said table, interlocking means associated with said tilting means for preventing the operation thereof when said car is not firmly clamped to said table, motor operated means for rocking said car and interlocking means for automatically controlling the speed of operation of said rocking means in accordance with the position of said table.

10. In a car-handling system, the combination with a car, a table, means for clamping said car to said table, and motor-operated means for rocking said table, of a system of control for said rocking device comprising means for automatically accelerating the motor to actuate said table from its extreme positions, means for automatically decelerating said motor when approaching said extreme positions, and means for returning said table to its normal position under predetermined conditions from any intermediate position thereof.

11. In a car-handling system, the combination with a movable table, of a motor for tilting said table, a motor for rocking said table in said tilted position, means for automaticaly accelerating the movement of said rocking motor when said table occupies its extreme positions and for decelerating the movement of said motor when approaching said extreme positions, means for returning said table to its normal position, and means for insuring the tilting operation of said system prior to said rocking operation.

12. A car-handling system comprising a table, a plurality of cars, a device for successively placing said cars on said table, and a clamping device for rigidly securing the selected car to said table, motor-operated means for tilting said table to a predetermined angle, a motor-operated device for rocking said table and means for inter-locking said rocking device in such manner as to prevent the operation thereof prior to operation of the remainder of the system.

13. In a car-handling system, the combination with a car, and a table, of a clamping device for engaging the ends of said car to secure the same to said table, a second clamping device for engaging the sides of said car, and interlocking means for preventing the operation of said second clamping device prior to the complete operation of the first-named clamping device.

14. In a car-handling system, the combination with a handling zone, a plurality of cars, a device for successively moving said cars into said zone, a clamp-device for rigidly securing said cars in place in said zone, and a master switch for governing the operation of each of said devices, of a line switch for controlling the supply of energy to said system, said line switch being interlocked with said devices for preventing the supply of energy to said system except when said master switches occupy their respective "off" positions.

15. In a car-handling system, the combination with a car-receiving table, and a motor for rocking said table, of a control system for said motor comprising means for automatically controlling the acceleration and deceleration of said motor in accordance with the position of said table, means for automatically arresting the movement of said table in its extreme positions, and means for arresting the movement of said table upon a failure of the power applied to said motor.

16. In a car-handling system, the combination with a car, a table, and clamps for securing said car to said table, of means for laterally tilting said car, means for longitudinally rocking said car in the tilted position, and interlocking means associated with said tilting means for preventing the operation of said system in other than said predetermined sequence.

In testimony whereof, I have hereunto subscribed my name this 8th day of March, 1920.

REESE T. KINTZING.